INVENTOR
Horace L. Gardner, Jr.,
BY
ATTORNEYS

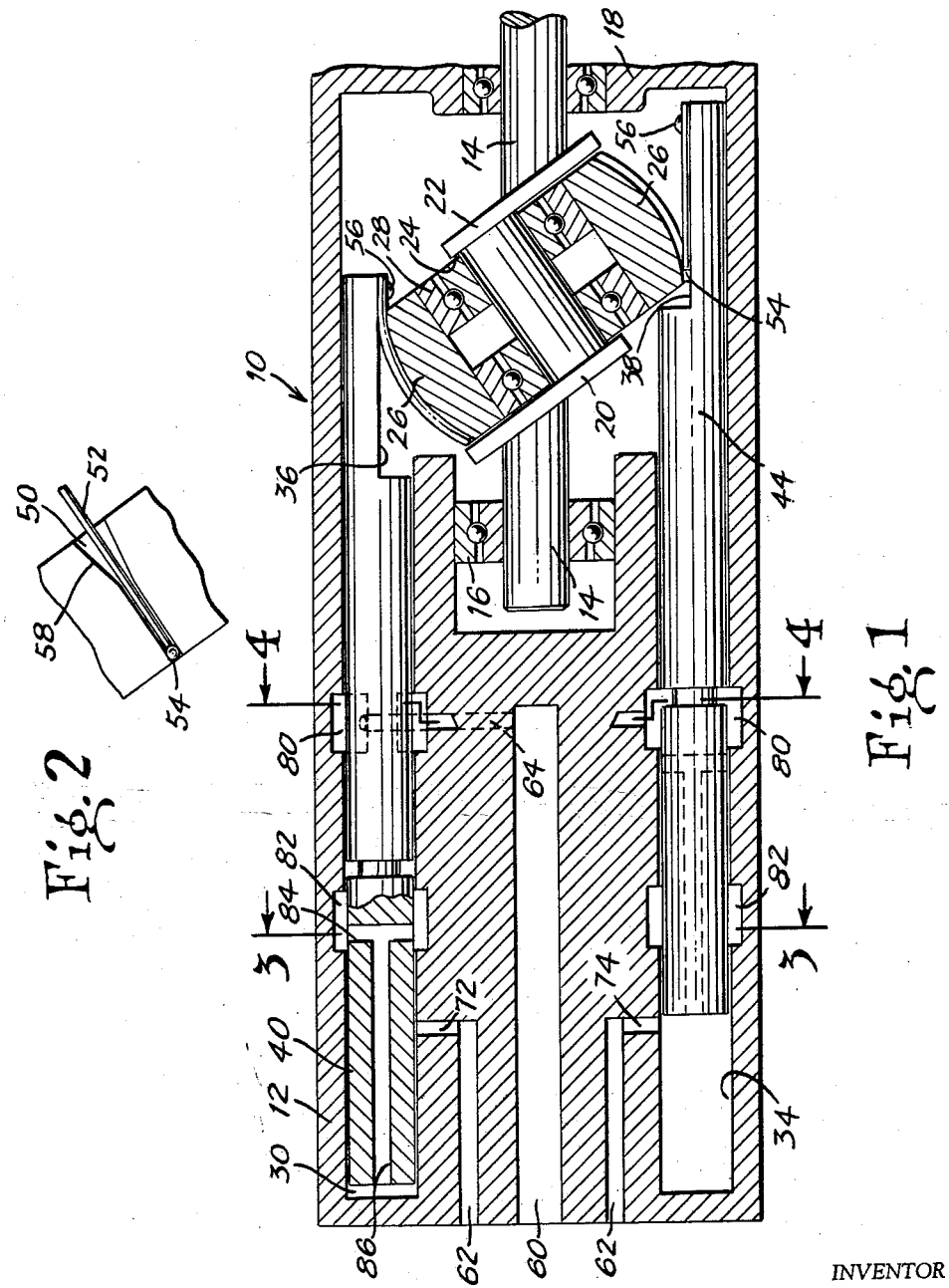

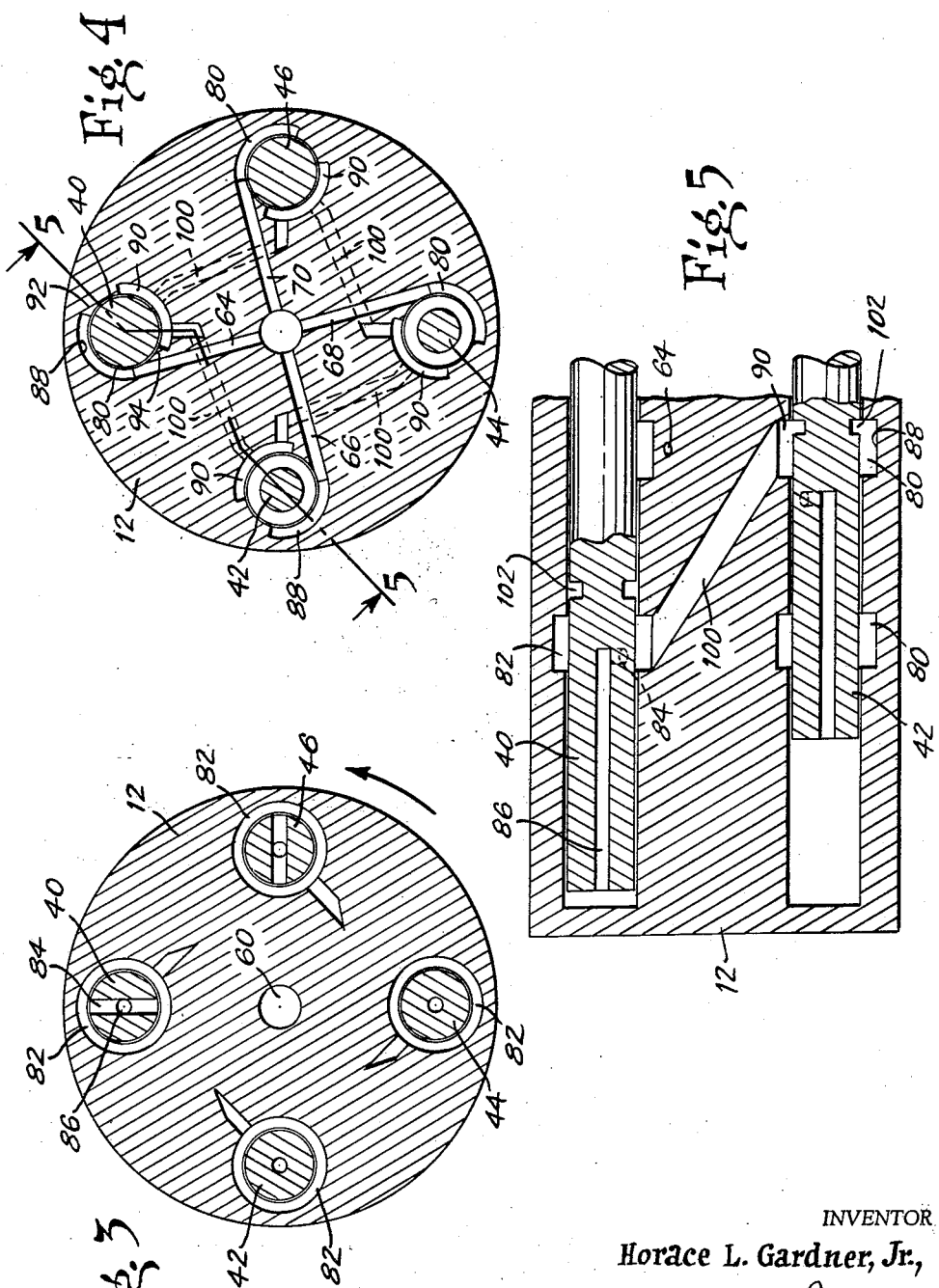

United States Patent Office 3,071,014
Patented Jan. 1, 1963

3,071,014
FLUID DRIVEN UNIT
Horace L. Gardner, Jr., Islip, N.Y., assignor to Fairchild Stratos Corporation, a corporation of Maryland
Filed Nov. 13, 1959, Ser. No. 852,645
3 Claims. (Cl. 74—60)

This invention relates to a fluid motor and more particularly to such a unit particularly adapted for use as a positive displacement motor operated from a source of hot gas under pressure.

According to the present invention a novel unit is provided which can operate as a motor for any fluid or gas. The principal of operation involves supplying preferably a hot gas under pressure to four or more pistons located radially around a crank shaft with center lines parallel to the center line of the shaft. Forces are transmitted to a wobble pulley or swash plate through steel cables which in turn cause rotation of an output shaft when the device is utilized as a motor. The flexible connection between the wobble pulley and pistons in the form of a steel cable results in extremely small side reactions on the pistons. Furthermore, the present invention has the important advantage that the flexible coupling construction permits the inherent small oscillatory motions to occur between the wobble pulley and pistons without employing highly loaded bearings or bearing surfaces such as in machines involving ball and socket joints.

An additional important feature of the novel fluid drive unit of the present invention involves a novel valve porting arrangement wherein the valve porting is accomplished for each piston by the piston which immediately precedes it in rotation. The ports are constructed so that side forces on the pistons created by high pressure gas are permanently balanced. Furthermore, the porting can be located in the piston cylinder walls in order to achieve any reasonable degree of gas expansion and power stroke overlap in order to eliminate any possibilities of "dead spots."

Another novel feature of the present invention includes the incorporation of a piston compression stroke which serves the purpose of preventing the inertia of each piston from causing shock in the steel cable during the last half of the piston return stroke.

The unit is particularly suited for high temperature operation and is extremely reliable particularly because of the substantial reduction in number of valving elements required.

It is therefore one object of the present invention to provide a novel fluid driven unit in the form of a fluid motor.

Another object of the present invention is to provide a fluid driven unit particularly suited for use as a motor driven by hot gases.

Another object of the present invention is to provide a fluid driven unit particularly suited for high temperature operation.

Another object of the present invention is to provide a novel fluid driven unit having increased reliability and longer wear.

Another object of the present invention is to provide a novel valving arrangement for a fluid driven unit.

These and other objects and advantages of the invention will be more apparent upon reference to the following specification, claims and appended drawings wherein:

FIGURE 1 is a vertical cross section through a fluid driven unit constructed in accordance with the present invention;

FIGURE 2 is a view showing the flexible cable and cable slots formed in the wobble pulley of FIGURE 1;

FIGURE 3 is a cross section taken along line 3—3 of FIGURE 1;

FIGURE 4 is a cross section taken along line 4—4 of FIGURE 1;

FIGURE 5 is a cross section taken along line 5—5 of FIGURE 4; and

Figure 6:
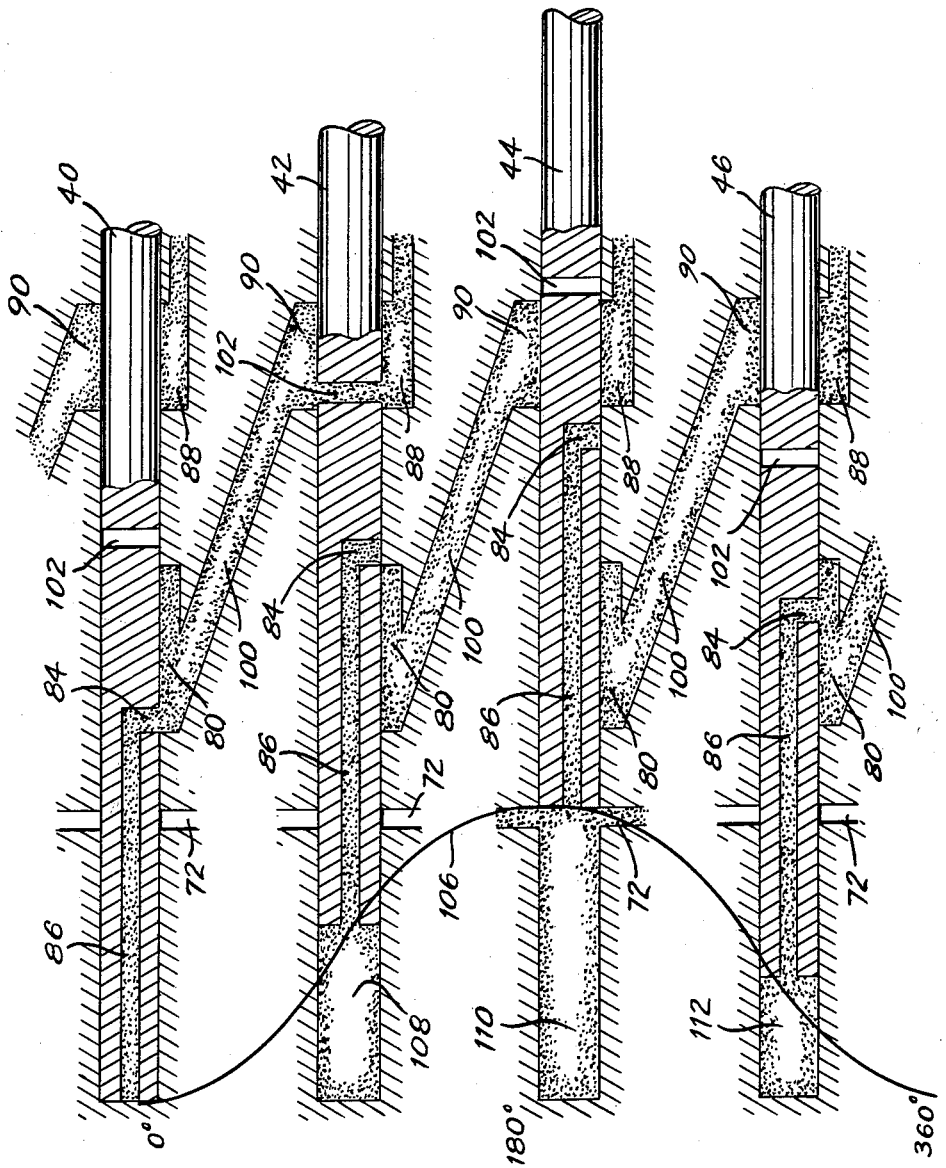
FIGURE 6 is a schematic diagram of the valve porting sequence of the unit shown in FIGURE 1.

Referring to the drawings and particularly to FIGURE 1, the fluid drive unit of the present invention generally indicated at 10 comprises a housing 12 in which is rotatably received a crank shaft 14 journalled in a pair of bearing supports 16 and 18.

Fixedly secured to the crank shaft 14 are a pair of angular or tilted cam plates 20 and 22 joined together by a stub shaft or spindle 24. A wobble pulley 26 is rotatably mounted on spindle 24 by means of bearing 28.

Housing 12 is formed with a plurality of cylinders two of which are indicated at 30 and 34 in FIGURE 1. Slidably received in each of these cylinders which as shown in FIGURES 3 and 4 are preferably four in number are pistons 40, 42, 44 and 46.

Each of the pistons is undercut as indicated at 36 and 38 in FIGURE 1 to provide clearance for wobble pulley 26. The upper and lower surfaces of the wobble pulley are formed with slots one of which is shown in plan in FIGURE 2 at 50 which slots receive a flexible coupling member in the form of a steel cable 52. The steel cable is riveted or otherwise securely fastened at one end as indicated at 54 to the upper surface of the wobble pulley and at its other end as indicated at 56 in FIGURE 1 to the undercut portions 36 and 38 respectively of each piston. While only two steel cable connections are shown in FIGURE 1, it will be understood that each of the pistons is similarly connected to the wobble pulley which latter is provided with a suitable slot for receiving the cable when the piston is in its leftward most position such as piston 40 in FIGURE 1. Each of the slots 50 is preferably formed with outwardly flaring trailing edges 58 permitting free movement of the respective steel cable from one side to the other of the slot further enhancing the free inherent oscillatory relative movement between the wobble pulley and each of the pistons.

Housing 12 is provided at one end with a central circular fluid inlet channel 60 and an annular fluid outlet channel 62. Inlet channel 60 communicates with each of the piston cylinders by means of a plurality of radially extending passageways 64, 66, 68 and 70 as best seen in FIGURE 4. Outlet channel 62 communicates with each of the cylinders by a second plurality of radial passageways two of which are indicated at 72 and 74 in FIGURE 1.

Each of the piston cylinders is provided with a two segment annular valving cavity 80 and an annular input cavity 82. Each of the pistons is provided with a fluid input slot 84 passing along a diameter completely through the piston and communicating with an axial slot 86 extending from the diametric slot 84 to the extreme end of the piston. As best seen in FIGURE 4, each of the annular valve slots 80 is divided into two segmental sections 88 and 90 by opposite projecting portions 92 and 94 of the housing 12 so that segmental sections 88 and 90 are not normally in communication but are cut-off from each other by the pistons.

As best seen in FIGURES 4 and 5, housing 12 is provided with four diagonal channels 100 connecting the gas input cavity 82 of each cylinder to the output segment 90 of the valve cavity 80 of the preceding cylinder. As seen in FIGURE 5, the input cavity of cylinder 40 is connected to the valve cavity of cylinder 42 which as clearly seen in FIGURE 3 is the cylinder next preceding cylinder 40 when the relative motion of the housing 12 with respect to the wobble pulley and shaft is in the direction indicated by the arrow in FIGURE 3.

Each of the cylinders is also provided with a reduced diameter portion 102 which in passing by valve cavity 80 permits the flow of gas between input segment 88 and output segment 90 around the reduced diameter of the piston. As can be seen in FIGURE 5, with hot gas under pressure constantly supplied to input segment 88, fluid is permitted to pass around the reduced diameter portion 102 into output segment 90, through diagonal passageway 100, into annular input cavity 80 through diametric slot 84 and along axial slot 86 extending along the interior of piston 40 to thereby gain access to the interior of piston chamber 30. Further movement of the preceding piston 42 beyond valve cavity 80 closes off communication between input segment 88 and output segment 90 of this cavity so that supply gas is cut off from the trailing piston 40.

A better understanding of the valve arrangement between the four pistons shown can be had from FIGURE 6 illustrating the valve porting sequence for the four pistons 40, 42, 44 and 46. Piston 40 is illustrated in its extreme leftmost position considered as zero displacement along displacement curve 106 as illustrated in FIGURE 6. The uppermost piston 40 is coupled to the source of hot pressure gas by means of reduced portion 102 formed in the next preceding piston 42 in FIGURE 6. The hot pressure gas fills diagonal channel 100 connecting the chambers of pistons 40 and 42 and fills the elongated axial slot 86 of piston 40.

Preceding piston 42 on the other hand has moved a quarter cycle along the displacement curve so that supply gas in diagonal channel 100 is cut-off from diametric slot 84 in piston 42 and also from supply segment 88 surrounding piston 44. With the rightward movement of piston 42 the gas 108 in the left hand end of the piston chamber is expanding driving the piston further to the right and further along the displacement curve.

Piston 44 is shown in the half cycle position with the exhaust gas 110 passing outwardly through exhaust port 72 and with the high pressure hot input gases completely cut off from the piston chamber. Piston 46 is shown at the three-quarter cycle position half way through the return stroke with the gas in end 112 under compressure as the piston moves towards the left and nears the end of the displacement curve.

An important feature of the present invention as evidenced from the valve porting sequence shown in FIGURE 6 is that in each instance, hot supply gas is valved to the piston through the next preceding piston so that a very accurate and reliable input gas valving sequence is assured. Furthermore, the utilization of a preceding piston to valve each piston completely does away with the necessity for separate input valve means for each of the pistons and substantially reduces the number of moving parts required in the fluid drive unit. Furthermore, the provision of annular valving in the cylinder walls makes it possible to permanently balance out the side reaction forces created by the high pressure gases so that no excessive side reactions are evidenced by the reciprocating piston. The provision of compression during the return piston stroke is important in preventing the inertia of a piston from causing shock in the flexible coupling provided by the steel cable during the last half of the return stroke.

It is apparent from the above that the present invention provides a novel fluid driven unit which may be utilized as a positive displacement motor to operate from a source of hot gas. While disclosed as so applicable, the present invention is not limited to a hot gas motor and may operate as a motor with any type of fluid, either liquid or gas. The transmission of forces to the wobble pulley from the piston through the flexible steel cable permits the free occurrence of inherent small oscillatory motion between the wobble pulley and the piston. The steel cable completely eliminates the necessity for highly loaded bearings or bearing surfaces necessarily involved in conjunction with the use of ball and socket or universal type joint couplings between the wobble plates or swash plates and the pistons of known constructions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid driven unit comprising a housing having a plurality of piston chambers formed therein and spaced equal angular distances about a common axis, pistons reciprocatably received in said chambers, a shaft journaled in said housing and rotatable about said axis, said shaft including a pair of angular plates joined by a spindle, a wobble pulley rotatable on said spindle, said wobble pulley including a plurality of spaced slots around its periphery, a flexible steel cable joining each piston to said wobble pulley, each of said cables being secured to said wobble pulley at one end of each of said slots.

2. A fluid driven unit according to claim 1 wherein the opposite ends of said slots are formed with outwardly flaring side walls.

3. A fluid-driven unit comprising a housing having a plurality of cylindrical piston chambers formed therein with their longitudinal center lines spaced radially from a common axis and spaced equal angular distances from each other, said chambers extending parallel to said axis, pistons mounted for axial reciprocation in said chambers, a shaft rotatably mounted on said axis, said shaft including a pair of angular plates joined by a spindle, a wobble pulley rotatable on said spindle, said pulley having an outwardly-facing convex rim the radius of curvature of which is substantially equal to the radial distance between said piston chambers and their common axis, and a flexible cable joined to each said piston at a point on its center line and fixed to the rim of said wobble plate whereby said pistons oscillate said wobble plate and rotate said shaft while generating substantially no side reactive forces on said pistons.

References Cited in the file of this patent

UNITED STATES PATENTS

| | | |
|---|---|---|
| 1,307,480 | Brackett | June 24, 1919 |
| 1,788,609 | Andrews | Jan. 13, 1931 |
| 2,127,773 | Horton | Aug. 23, 1938 |
| 2,285,476 | Wahlmark | June 9, 1942 |
| 2,364,004 | Shaff | Nov. 28, 1944 |
| 2,424,660 | Howard | July 29, 1947 |
| 2,702,483 | Girodin | Feb. 22, 1955 |
| 2,931,312 | Donner | Apr. 5, 1960 |

FOREIGN PATENTS

| | | |
|---|---|---|
| 434,595 | France | Nov. 30, 1911 |